(12) United States Patent
Asher et al.

(10) Patent No.: US 7,866,543 B2
(45) Date of Patent: Jan. 11, 2011

(54) SECURITY AND PRIVACY ENFORCEMENT FOR DISCOVERY SERVICES IN A NETWORK OF ELECTRONIC PRODUCT CODE INFORMATION REPOSITORIES

(75) Inventors: Anthony C. Asher, Bethesda, MD (US); Steven P. Beier, San Jose, CA (US); Christian C. Clauss, Meinier (CH); Tyrone W. A. Grandison, San Jose, CA (US); Karin Kailing, San Jose, CA (US); Ralf Rantzau, San Jose, CA (US); Gary Robinson, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 525 days.

(21) Appl. No.: 11/562,184

(22) Filed: Nov. 21, 2006

(65) Prior Publication Data

US 2008/0120725 A1    May 22, 2008

(51) Int. Cl.
*G06F 17/00* (2006.01)
(52) U.S. Cl. .................. 235/375; 235/382; 235/385; 705/28; 705/67; 713/156
(58) Field of Classification Search .......... 235/375, 235/382, 385; 713/156, 157; 705/28, 64–67; 707/999.009
See application file for complete search history.

(56) References Cited

U.S. PATENT DOCUMENTS

| | | | |
|---|---|---|---|
| 6,901,304 B2 | 5/2005 | Swan et al. | |
| 7,091,861 B2 | 8/2006 | Schmidtberg et al. | |
| 2004/0222878 A1 | 11/2004 | Juels | |
| 2004/0233040 A1 | 11/2004 | Lane et al. | |
| 2005/0114270 A1* | 5/2005 | Hind et al. | 705/64 |
| 2005/0137904 A1 | 6/2005 | Lane et al. | |
| 2006/0033608 A1 | 2/2006 | Juels et al. | |
| 2006/0047789 A1 | 3/2006 | Kumar et al. | |
| 2006/0106718 A1* | 5/2006 | Spellman et al. | 705/50 |
| 2006/0108411 A1 | 5/2006 | Macurek et al. | |
| 2006/0112123 A1 | 5/2006 | Clark et al. | |
| 2006/0124722 A1* | 6/2006 | Williams et al. | 235/375 |
| 2006/0145812 A1 | 7/2006 | Sajkowsky | |
| 2006/0148443 A1 | 7/2006 | Burg et al. | |
| 2006/0149566 A1 | 7/2006 | Lin | |

(Continued)

OTHER PUBLICATIONS

VeriSign EPC Network Services, EPC Information Service Implementation Guide, Version 1.5, Aug. 2004.*

(Continued)

*Primary Examiner*—Michael G Lee
*Assistant Examiner*—Suezu Ellis
(74) *Attorney, Agent, or Firm*—Mollborn Patents, Inc.; Fredrik Mollborn

(57) ABSTRACT

Methods and apparatus, including computer program products, implementing and using techniques for managing security and privacy associations between an electronic product code value and an address of a repository containing information about an item represented by the electronic product code. A security certificate is issued to each of one or more parties that are authorized to use the repository. In response to a party among the one or more parties sensing the electronic product code, a record is created in the repository. The record represents the sensing of the electronic product code and includes a security certificate belonging to the party that sensed the electronic product code.

33 Claims, 7 Drawing Sheets

U.S. PATENT DOCUMENTS

| | | | |
|---|---|---|---|
| 2006/0149635 A1 | 7/2006 | Bhatti et al. | |
| 2006/0163338 A1 | 7/2006 | Allen et al. | |
| 2006/0168112 A1* | 7/2006 | Weng et al. | 709/218 |
| 2006/0208885 A1 | 9/2006 | Lin | |
| 2006/0237547 A1 | 10/2006 | Barenburg et al. | |
| 2006/0250248 A1 | 11/2006 | Tu et al. | |
| 2006/0277061 A1* | 12/2006 | Revanur et al. | 705/1 |
| 2007/0043827 A1 | 2/2007 | Banerjee | |
| 2007/0050305 A1* | 3/2007 | Klein | 705/67 |
| 2007/0055586 A1 | 3/2007 | Lucas | |
| 2007/0156281 A1* | 7/2007 | Leung et al. | 700/225 |
| 2008/0109411 A1* | 5/2008 | Young et al. | 707/3 |
| 2008/0157927 A1 | 7/2008 | Soppera et al. | |
| 2008/0157933 A1 | 7/2008 | Winkler | |

OTHER PUBLICATIONS

Mark Harrison, EPC Information Service (EPCIS), Auto-ID Centre, Institute for Manufacturing, University of Cambridge, Jan. 2004.*

PCT Notification of Transmittal of the International Search Report and the Written Opinion of the International Searching Authority, or the Declaration. Date of mailing Mar. 12, 2008. PCT/EP2007/062389.

Document XP002456414. "Statement in accordance with the Notice from the European Patent Office dated Oct. 1, 2007 concerning business methods (OJ Nov. 2007; pp. 592-593)."

VERISIGN, "EPC Network Architecture", 2004.

Konidala et al., "Mobile RFID Security Issues", SCIS 2006, Symposium on Cryptography and Information Security, Hiroshima, Japan, Jan. 17-20, 2006.

Traub et al., "The EPCglobal Architecture Framework", EPCglobal, 2005, 2004.

Song et al., "Security Enhanced RFID Middleware System", Enformatika v.10 Dec. 2005: 79-82.

Office Action in related U.S. Appl. No. 11/670,245, dated Feb. 8, 2010.

Radko, John et al., "Network Data Sharing Panel Discussion", EPC DevCon, 2005. Retrieved Dec. 26, 2006 <http://www.epcdevcon.com/agenda.html#0100000D>.

Asher, C., "EPCIS-Building the Infrastructure to Support the Technology", NACDS 2006. Retrieved Dec. 26, 2006 <http://meetings.nacds.org/RFID/2006/education_sessions.cfm?Log=1>.

* cited by examiner

SECURITY AND PRIVACY ENFORCEMENT FOR DISCOVERY SERVICES IN A NETWORK OF ELECTRONIC PRODUCT CODE INFORMATION REPOSITORIES

BACKGROUND

This invention relates to security management of electronic product code information. Electronic Product Codes (EPC) is a family of coding schemes for RFID (Radio Frequency IDentification) tags. The EPC is designed to meet the needs of various industries, while guaranteeing the uniqueness for all EPC-compliant tags. All EPC numbers contain a header identifying the encoding scheme that has been used. This in turn dictates the length, type and structure of the EPC. EPC coding schemes typically contain a serial number which can be used to uniquely identify a single object. For example, a 96-bit EPC number allows approximately $1.3 \times 10^{16}$ items to be coded annually, roughly corresponding to the number of grains of rice consumed globally each year.

The RFID and EPC technologies provide the basis for new traceability applications for products to emerge everywhere. Parties that want to share their data to create increased business value need new mechanisms for querying traceable data. In addition to business considerations, companies are more likely to share their data if the services infrastructure is scalable, secure and easy to use.

The EPCglobal Network architecture describes components and interfaces for EPC-related information exchange between servers that contain information about items identified by EPC numbers. The servers, typically known as EPCISs (EPC Information Services), which are linked through a set of network services, store relevant product information related to specific EPC numbers. Each EPCIS typically contains the following information for each EPC number: a read time at which an RFID reader registered the EPC, a capture time at which the EPCIS registered the read EPC, a location of the reader, an action (typically "observe"), and several optional product-specific attributes. For example, an RFID reader may also register the temperature or radioactivity of an item. The EPCIS provides an interface for executing ad-hoc queries as well as standing queries that deliver new results periodically. The standardization of this interface encourages the marketplace to provide vendor-specific implementations, which increase the scope of use of the EPCglobal Network services.

Many of the most valuable use cases for RFID require information exchange between companies. However, gathering cross-company supply chain data can be expensive, time-consuming and unrealizable given security concerns. Thus, there is a need for improvements to the EPCglobal Network architecture that addresses these issues.

SUMMARY

The present invention provides methods and apparatus for improving security and privacy associations between an EPC number and an address of a repository storing information about the item associated with the EPC number.

In general, in one aspect, the invention provides methods and apparatus, including computer program products, implementing and using techniques for managing security and privacy associations between an electronic product code value and an address of a repository containing information about an item represented by the electronic product code. A security certificate is issued to each of one or more parties that are authorized to use the repository. In response to a party among the one or more parties sensing the electronic product code, a record is created in the repository. The record represents the sensing of the electronic product code and includes a security certificate belonging to the party that sensed the electronic product code.

Various embodiments can include one or more of the following features. A data sharing attribute can be stored with each record in the repository. The data sharing attribute specifies a subset of parties among the one or more parties that has permission to access the record. Sensing the electronic product code can include sensing the electronic product code with a radio frequency identification sensor. The one or more parties can be represented by electronic product code information services. Creating a record can include creating a record immediately upon a party among the one or more parties sensing an electronic product code for the first time. The subset of parties specified by the data sharing attribute can include all parties authorized to use the repository. The subset of parties specified by the data sharing attribute can include parties authorized to use the repository and which have sensed the electronic product code associated with the record.

In general, in another aspect, the invention provides methods and apparatus, including computer program products, implementing and using techniques for managing security and privacy associations between an electronic product code value and an address of a repository containing information about an item represented by the electronic product code. A service interface is provided that includes services which enable secure traceability of the item represented by the electronic product code. The service interface also defines mechanisms for secure and privacy-preserving network access to the records in the repository by one or more querying parties.

Various embodiments can include one or more of the following features. The service interface can include a Notify service for storing a new record in the repository when a party senses an electronic product code that the party has not sensed before. The service interface can include a Get all addresses service for obtaining data about what parties have sensed a particular electronic product code. The service interface can include a Get first address service for obtaining data about the first party to notify the repository about the existence of a particular electronic product code. The service interface can include a Get last address service for obtaining data about the party that currently has custody of an item with a particular electronic product code. The service interface can include a Get my records service for obtaining data about which electronic product codes a querying party has sensed.

The service interface can include a Get my record service for obtaining data about the record belonging to the querying party for a particular electronic product code, if such a record exists in the repository. The service interface can include a Change visibility service for changing a data visibility attribute belonging to the querying party for a particular electronic product code. The service interface can include a Delete my record service for removing a record belonging to the querying party for a particular electronic product code. The service interface can include a Delete my old records service for removing from the repository any records belonging to the querying party having a timestamp lower than a current timestamp. The service interface can be a web service interface or an application programming interface.

In general, in another aspect, the invention provides a discovery service for mapping an electronic product code number to a set of electronic product code information services that include event information and item information about the electronic product code number. The discovery service includes a database and a service interface. The database contains records that represent a first sensing of the electronic product code by the respective electronic product code information services. Each record includes a security certificate belonging to the electronic product code information service that sensed the electronic product code, and a data sharing attribute specifying a subset of electronic product code information services that has permission to access the record. The service interface enables electronic product code information services and applications to access the records in accordance with the specified data sharing attributes in each record. The service interface includes several services enabling secure traceability of the item represented by the electronic product code.

The invention can be implemented to include one or more of the following advantages. Scalable, security and privacy aware discovery services are provided that enable selective information sharing and proactive product management, by intelligently combining the use of certificates, enforcement of row-level data access control, and incorporation of proxy services with the existing EPCglobal network architecture. The sharing of data between parties can be controlled easily through the use of visibility controls. The methods and systems in accordance with various embodiments of the invention enable applications to use basic operations to solve complex business problems related to EPCs. Some examples of such business problems include product authentication (to prevent counterfeiting) and product recall (to quickly identify and target only the affected parties without having to broadcast recalls to every party in an EPCIS network). In general, the methods and systems of the invention serve as building blocks of secure and privacy-preserving traceability applications.

The details of one or more embodiments of the invention are set forth in the accompanying drawings and the description below. Other features and advantages of the invention will be apparent from the description and drawings, and from the claims.

DESCRIPTION OF DRAWINGS

Like reference symbols in the various drawings indicate like elements.

DETAILED DESCRIPTION

General overview

Figure 1:
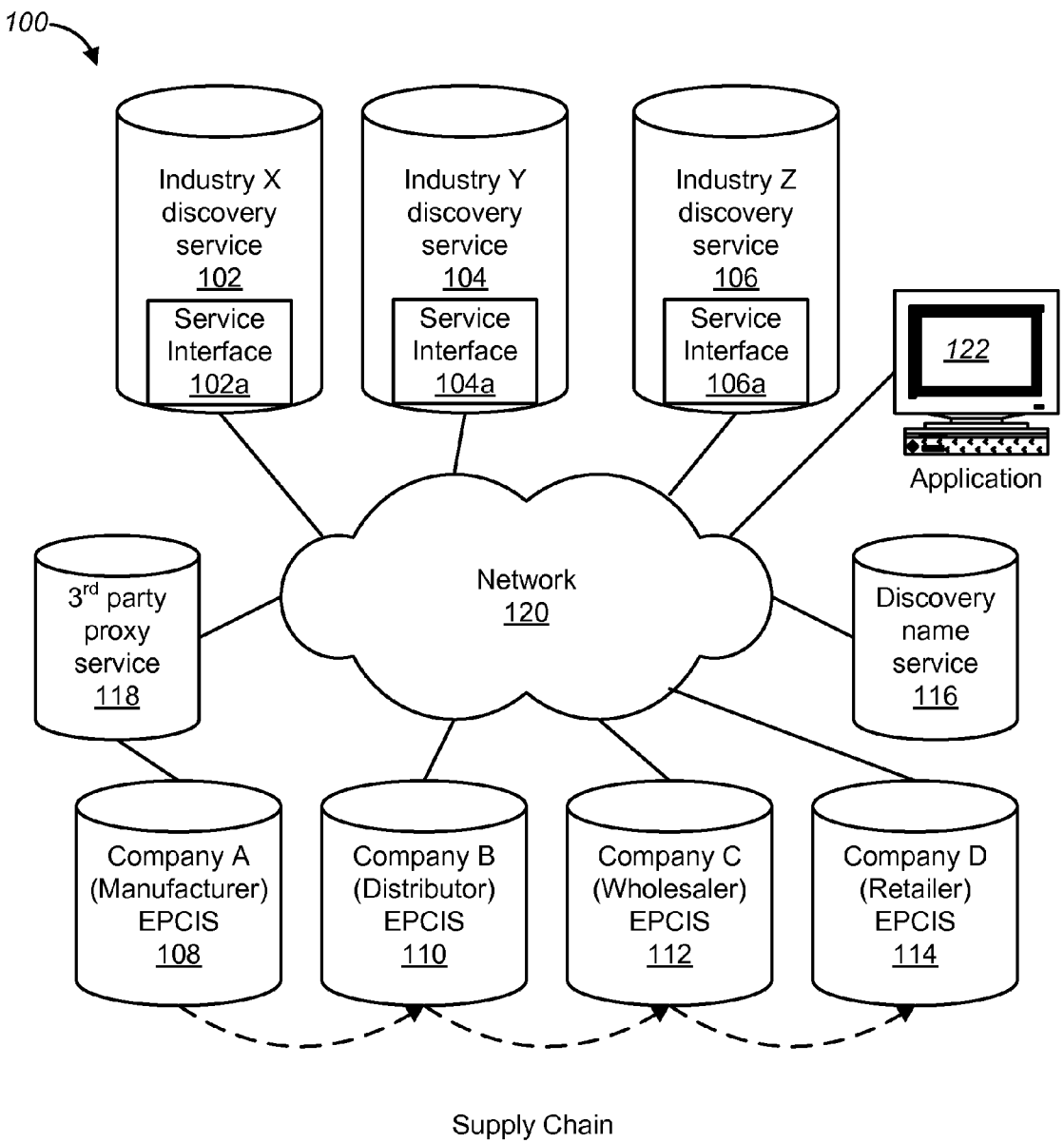
FIG. 1 shows a schematic view of an EPCglobal network in accordance with one embodiment of the invention.

As shown in FIG. 1, an exemplary EPCglobal network (100) includes several discovery services (102, 104, 106), several EPCISs (108, 110, 112, 114), a discovery name server (116), a proxy service (118) and a network (122) over which the different components of the EPCglobal network (100) communicate. In some embodiments of the invention, the discovery services (102, 104, 106) include a database and a set of service interfaces. The discovery services (102, 104, 106) simplify the data exchange process by offering a service that links information about RFID-enabled items as the items move through a supply chain from a manufacturer (108), through a distributor (110) and a wholesaler (112) to a retailer (114). As an item passes through the supply chain and is registered by RFID readers, the corresponding EPCIS (108, 110, 112, 114) sends data to the appropriate discovery service (102, 104, 106). The data is received through the respective discovery services interfaces (102a, 104a, 106a), which will be described in further detail below and contain services that enable a secure and privacy-preserving communication between the EPCISs (108, 110, 112, 114) and the discovery services (102, 104, 106). This allows trading partners to find all parties who had possession of a given item and to share RFID events about that item. The trading partners can thereby proactively manage their supply chains. Typically, these operations are carried out using special applications (122), which can communicate with the different entities in the EPC global network (100). It should be noted, however, that the applications (122) can also be used by companies and other entities that are not actively involved in a supply chain scenario, but have received permission to obtain information about a specific product or set of products. Further details of how this is accomplished will be described below with reference to FIG. 2 and FIGS. 3A-3E.

As can be seen in FIG. 1, in some embodiments of the invention, the discovery services (102, 104, 106) are industry specific, which allows for grouping of industry-specific information. The discovery name service (116) can be queried by various applications to provide information about which discovery service (102, 104, 106) contains information about a particular EPC. In some implementations the EPCglobal network (100) includes proxy services (118), for example, for companies, such as company A (108) that would like to keep their network address anonymous. The network (120) through which the various entities communicate can be a public or private network, such as the Internet, and the communication over this network (120) can be done through any conventional wired or wireless means.

In some implementations when the service interfaces (102a, 104a, 106a) of the discovery services (102, 104, 106) are exposed to the network (120), such as the Internet, they can be invoked by any computer on the network (120). However, the invoker must be authorized by an authoritative party, such as EPCglobal, before the service interfaces (102a, 104a, 106a) of the discovery services (102, 104, 106) can be used. After registration with the authoritative party, a trusted third party issues a signed certificate to the invoker. This signed certificate is used by the invoker in all transactions with the discovery services (102, 104, 106). The authorization and certificate can be used to limit read or write access to certain data elements. When a service interface (102a, 104a, 106a) is invoked, a log is also created, so that all transactions involving the discovery services (102, 104, 106) are recorded. The service interfaces (102a, 104a, 106a) allow authorized companies to register EPCs and EPCIS URL links when they manufacture or receive a new item. Additionally, authorized companies can retrieve links to all EPCISs that contain events for a specific EPC. In some implementations the discovery services (102, 104, 106) store records with the following attributes: an EPC number of the item, a URL or the EPCIS that submitted this record to indicate that it had custody of the item, a certificate of the company whose EPCIS submitted this record, a visibility flag indicating whether the record can be shared with anybody, or only with parties who submitted records about the same EPC, that is, supply chain partners, and a timestamp of when the record was inserted Operations within the EPCglobal Network An exemplary general process involving the various entities of FIG. 1 will now be described with reference to FIG. 2, followed by a more detailed description of the service interfaces (102a, 104a, 106a) and the management of privacy and security issues of discovery services (102, 104, 106).

Figure 2:
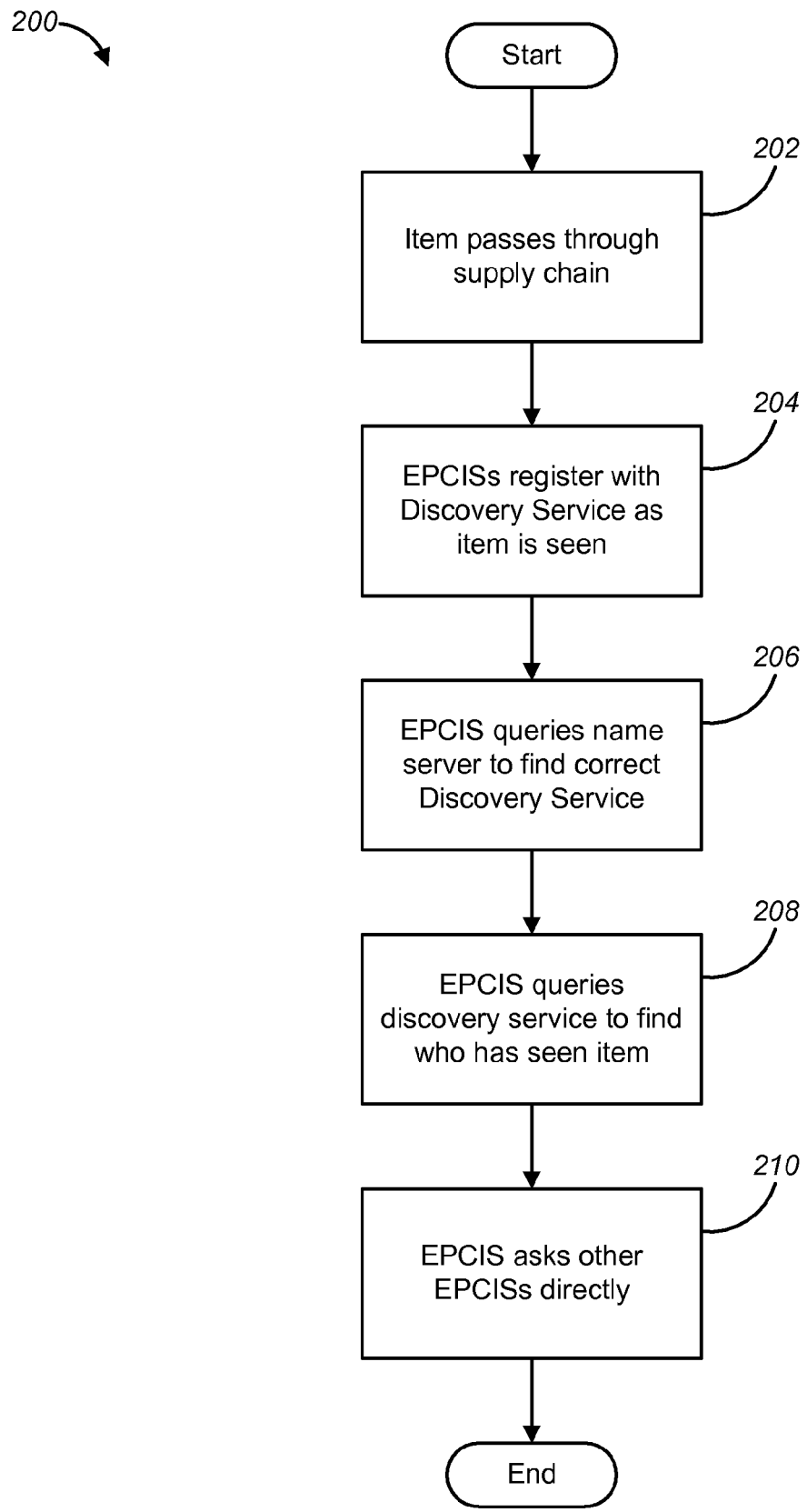
FIG. 2 is a flowchart showing an exemplary information exchange between the various entities in FIG. 1.

As can be seen in FIG. 2, the process (200) starts with an item passing through a supply chain, as shown in FIG. 1, from the manufacturer (108) through the distributor (110) and wholesaler (112) to the retailer (114) (step 202). As the item passes through the supply chain, each EPCIS along the supply chain registers the EPC of the item with the appropriate discovery service, for example, Industry Y discovery service (104) (step 204). In some embodiments, the registration only occurs when the EPCIS captures an event about the EPC for the first time. By registering the EPC with the discovery service (104), the EPCIS declares that the EPCIS had custody of the item associated with the EPC and is thus a keeper of information about the item.

Next, a participant in the supply chain, for example, the retailer (114) would like to search for information about an item with a given EPC that the retailer (114) has received. The retailer (114) must find the EPCISs of all companies that have had prior custody of the item, that is, the manufacturer (108), the distributor (110) and the wholesaler (112). Unless the retailer (114) already knows the address of its discovery service (104), the retailer (114) queries a discovery name server (116) to find the correct discovery service (step 206). The discovery name service (116) returns the address of the industry Y discovery service (104) to the retailer. The EPCIS of the retailer (114) then queries the industry Y discovery service (104) to get the EPCIS addresses for the other parties in the supply chain (step 208). The EPCIS of the retailer (114) then queries the EPCIS for each participant in the supply chain directly (step 210) using the retrieved addresses, and obtains the requested information about the EPC, which ends the process (200). It should be noted that some of the obtained addresses may not point to a company's EPCIS directly because the company may have decided to be anonymous and use a third party proxy service. This is illustrated, for example, in FIG. 1, where Company A (108) communicates with the network (120) through a third party proxy service (118).

Security and Privacy

EPC event data is a valuable asset that companies are likely to share only with certain trading partners and only under special conditions. Therefore security and privacy issues are important concerns. In various implementations of the invention, these issues are addressed on three levels: the network level, the EPCIS level, and the discovery service level, as will now be described.

On the network level, security and privacy can be enhanced by using proxy services (118), as discussed above, which provide a level of anonymity for the entities interacting in the EPCglobal network On the EPCIS level, security and privacy can be enhanced by role-based, policy-based, cell-level data disclosure control. This enables the owner of an EPCIS to restrict data disclosure to the parties that have a valid business reason to access the information. Typically, these parties are the trading partners in the supply chain (or, alternatively, other parties that pay to have access to this information). While some parties, such as shipping companies, may need to see item-specific attributes, such as temperature for item quality control, other parties, such as retailers, should only be able to see quantity information, such as the number of items in a particular container. The role-based, policy-based, cell-level data disclosure control enables this level of granularity.

On the discovery service level, access control is very important, since the discovery service contains all the EPCIS information associated with a particular EPC. One level of security control in the discovery service is achieved through the visibility control, which was discussed above. That is, the owner of a record decides whether the record can be shared with anybody in the network or whether access is restricted to parties that have created records for the same EPC number (that is, only the parties that belong to a chain of trading partners).

Another level of security for the discovery service, in accordance with some embodiments of the invention, is achieved through the service interface (102a, 104a, 106a) of the discovery service (102, 104, 106). The service interface (102a, 104a, 106a) can be implemented, for example, in the form of a web service, as currently suggested by the EPCglobal organization, or as an application programming interface (API). The service interface (102a, 104a, 106a) is used by EPCIS systems for notifying the discovery service (102, 104, 106) about the existence of an EPC. Moreover, the service interface (102a, 104a, 106a) is also used by applications in basic operations aiming to solve more complex business problems related to EPCs, such as product authentication (to prevent counterfeiting), or product recall (to quickly identify and target only the affected parties—companies, distributors, retailers—without having to broadcast recalls to every party in a supply chain). Some of the services realized by the service interface (102a, 104a, 106a) in various embodiments of the invention will now be described. In general, these services form the building blocks of secure and privacy-preserving traceability applications, and any party (e.g., EPCIS or application) that wishes to use a service must present a valid signed security certificate as part of the request.

A Notify service receives as input an EPC number, an address of the EPCIS, a certificate of the organization owning the EPCIS and a visibility attribute. The service returns no result when called. The purpose of the service is as follows. When an EPCIS senses an EPC that the EPCIS has never sensed before (e.g., a company has received an item for the first time or has manufactured a new item), the EPCIS will invoke this service. The discovery service will store a new record in its database. The owner of the certificate defines the data sharing attribute (visibility). Informally, it declares to the network "I have seen this EPC."

A Get all addresses service receives as input an EPC number and a certificate of the organization owning the EPCIS. When called, the service returns a set of EPCIS addresses within records for the given EPC, whose certificate owners allow sharing of the record's data with this certificate owner. Informally, the service answers the question "Who has seen this item before?"

A Get first address service receives as input an EPC number and a certificate of the organization owning the EPCIS. When called, the service returns an EPCIS address of the record with the lowest timestamp for the given EPC whose certificate owner allows sharing the record's data with this certificate owner. Typically, this service can be used in a supply chain to find the EPCIS of the item manufacturer—who is the first party to notify the Discovery Services about the existence of this EPC. Informally, the service answers the question "Where can I find the item manufacturer?"

A Get last address service receives as input an EPC number and a certificate of the organization owning the EPCIS. When called, the service returns an EPCIS address of the record with the highest timestamp value for the given EPC whose certificate owner allows sharing the record's data with this certificate owner. Typically, this can be used in a supply chain to find the EPCIS of the party that has currently custody of the item. Informally, the service answers the question "Where is this item now?"

A Get my records service receives as input a certificate of the organization owning the EPCIS. When called, the service returns a set of all records belonging to the certificate owner. Informally, the service answers the question "Which items did I see so far."

A Get my record service receives as input an EPC number and a certificate of the organization owning the EPCIS. When called, the service returns the record belonging to the certificate owner for the given EPC, or no record if no such record exists. Informally, the service answers the question "What did I declare about the existence of the item?" This subsumes the question "When did I notify the Discovery Service that I've seen the item?" as well as "What is the current visibility of my record?"

A Change visibility service receives as input an EPC number and a certificate of the organization owning the EPCIS. When called no result is returned. The purpose of the service is to change the data sharing category belonging to the certificate owner for the given EPC. Informally, the service allows the certificate owner to declare "I want to share this information with everybody from now on," or "I do not want to share this information with everybody from now on," respectively.

A Delete my record service receives as input an EPC number and a certificate of the organization owning the EPCIS. When called no result is returned. The purpose of the service is to remove the record belonging to the certificate owner for the given EPC. Typically, this service is invoked if the corresponding information in the EPCIS associated with the given EPC is removed. However, the service can also be invoked if there are other reasons as to why the existing local information should no longer be shared with the EPCIS network. Informally, the service allows declaring "I have no relevant information about this item anymore."

A Delete my old records service receives as input an EPC number, a certificate of the organization owning the EPCIS, and a timestamp. When called no result is returned. The purpose of the service is to remove the records belonging to the certificate owner whose timestamp is lower than the given timestamp. Analogous to the service Delete my record, this service is invoked if the corresponding records in the EPCIS are removed as well. Informally, the service allows declaring "I have no relevant information anymore about those items that I have seen before the given time."

Together these various methods of security and privacy preservation provide a scalable and secure model that enables the various participants in the EPCglobal network to securely and at a level of high granularity share the appropriate EPC information with trading partners and/or other companies, as desired. Full traceability of individual items is ensured, while at the same time not risking disclosing confidential company information.

Use Example

An exemplary use of the above system and methods will now be described with reference to FIGS. 3A-3E. The exemplary use is based on the following scenario: It is one week before Super Bowl, the championship game of the National Football League in the United States and a nation-wide television highlight. Preparing a home-made guacamole from California-grown avocados for this event has become very popular. National Produce Distributors (NPD), a U.S.-wide fruits and vegetables wholesaler supplies many retailers, among them the Trader Jill's (TJ) store chain that are currently filling their avocado stocks. Spud is an NPD supply chain manager, Sandy is a TJ's store manager in San Fernando, Calif., and Nick is a TJ's store manager in New York City. Both, Sandy and Nick are expecting shipments of fresh California-grown avocados. It should be noted that all the companies and names used herein are fictitious.

Figure 3A:
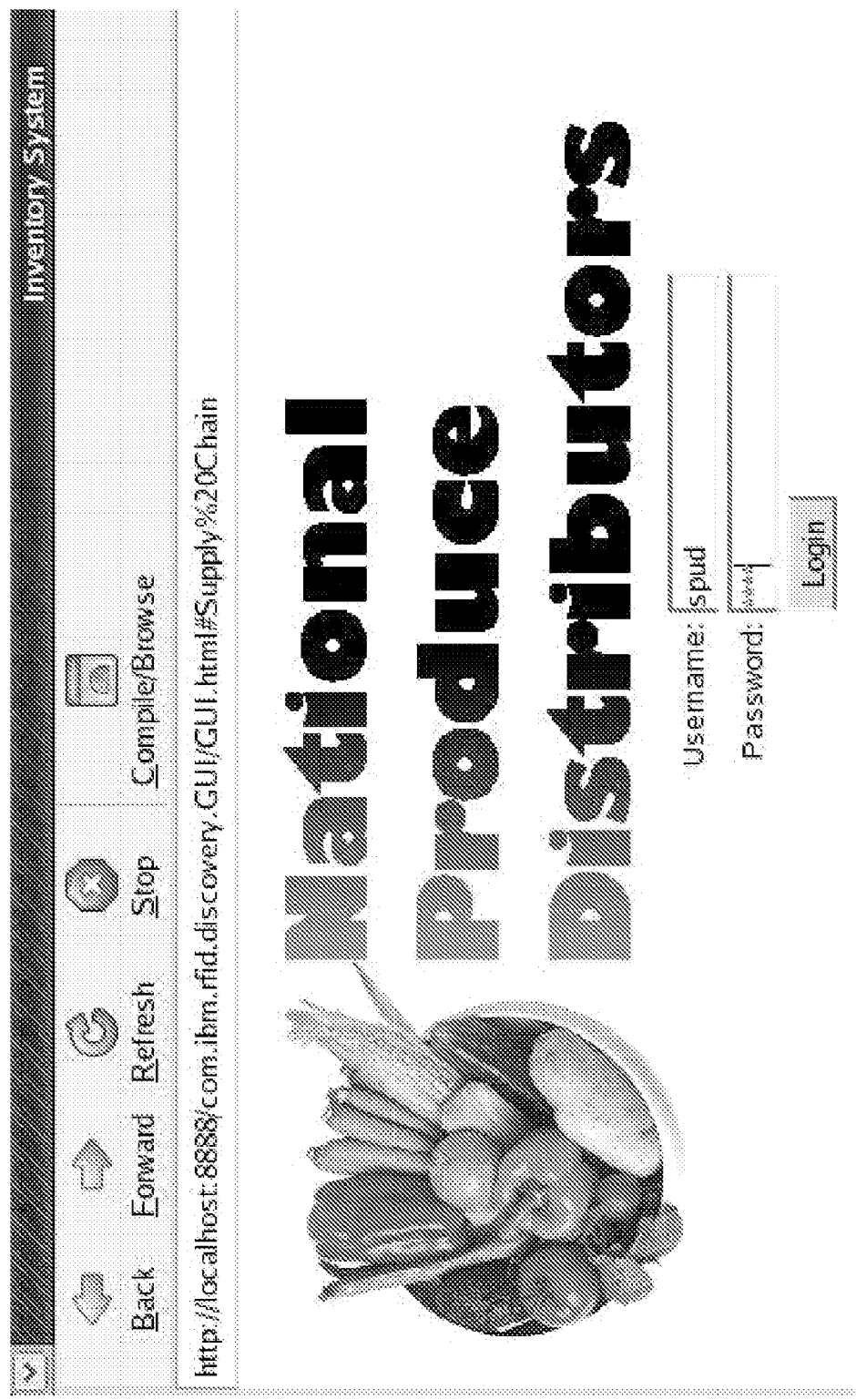
FIG. 3A is a screenshot of a login screen of an application that leverages the EPCIS and the discovery services of FIG. 1.
Figure 3B:
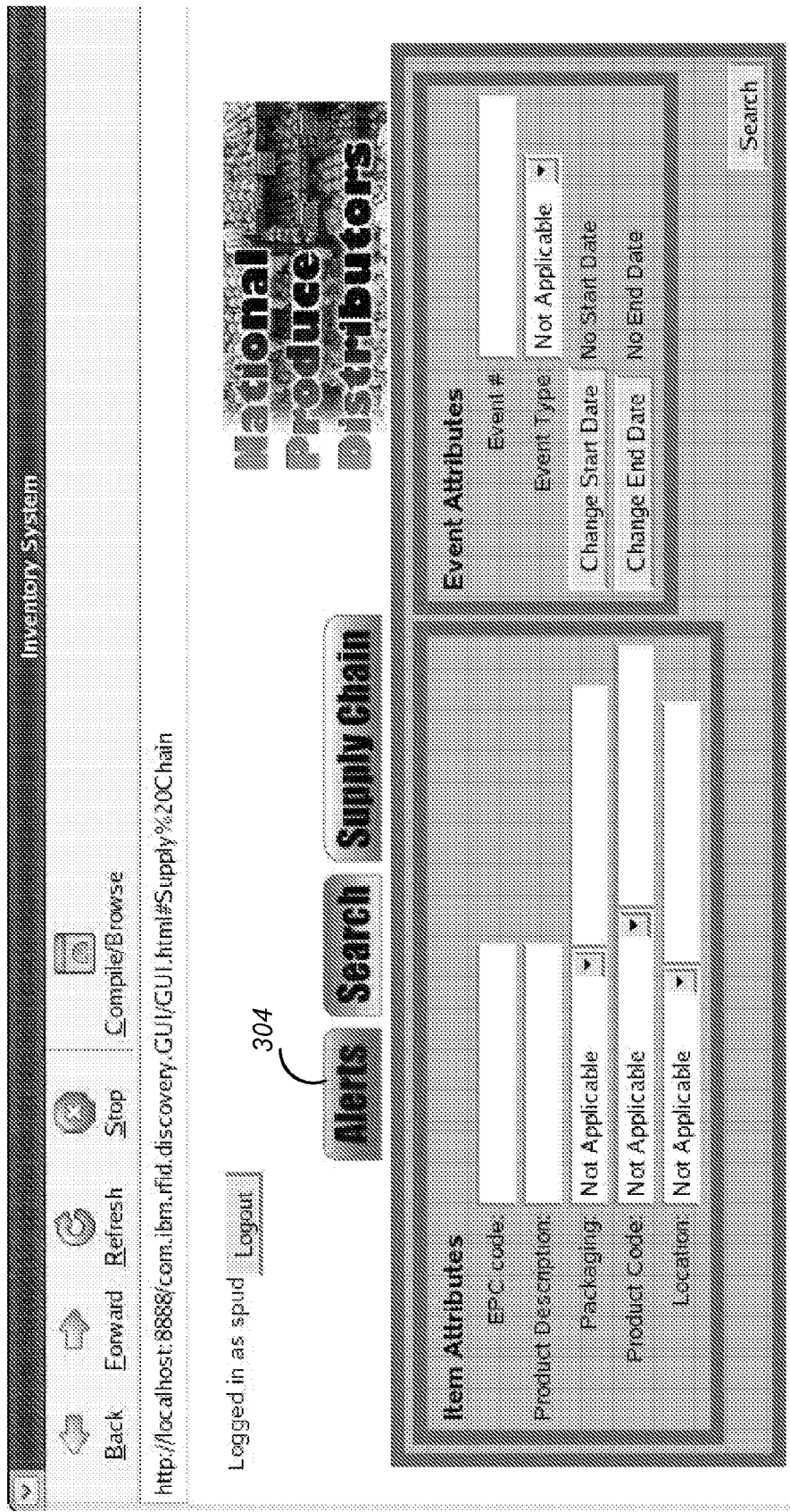
FIG. 3B is a screenshot of a home page of the application in FIG. 3A.
Figure 3C:
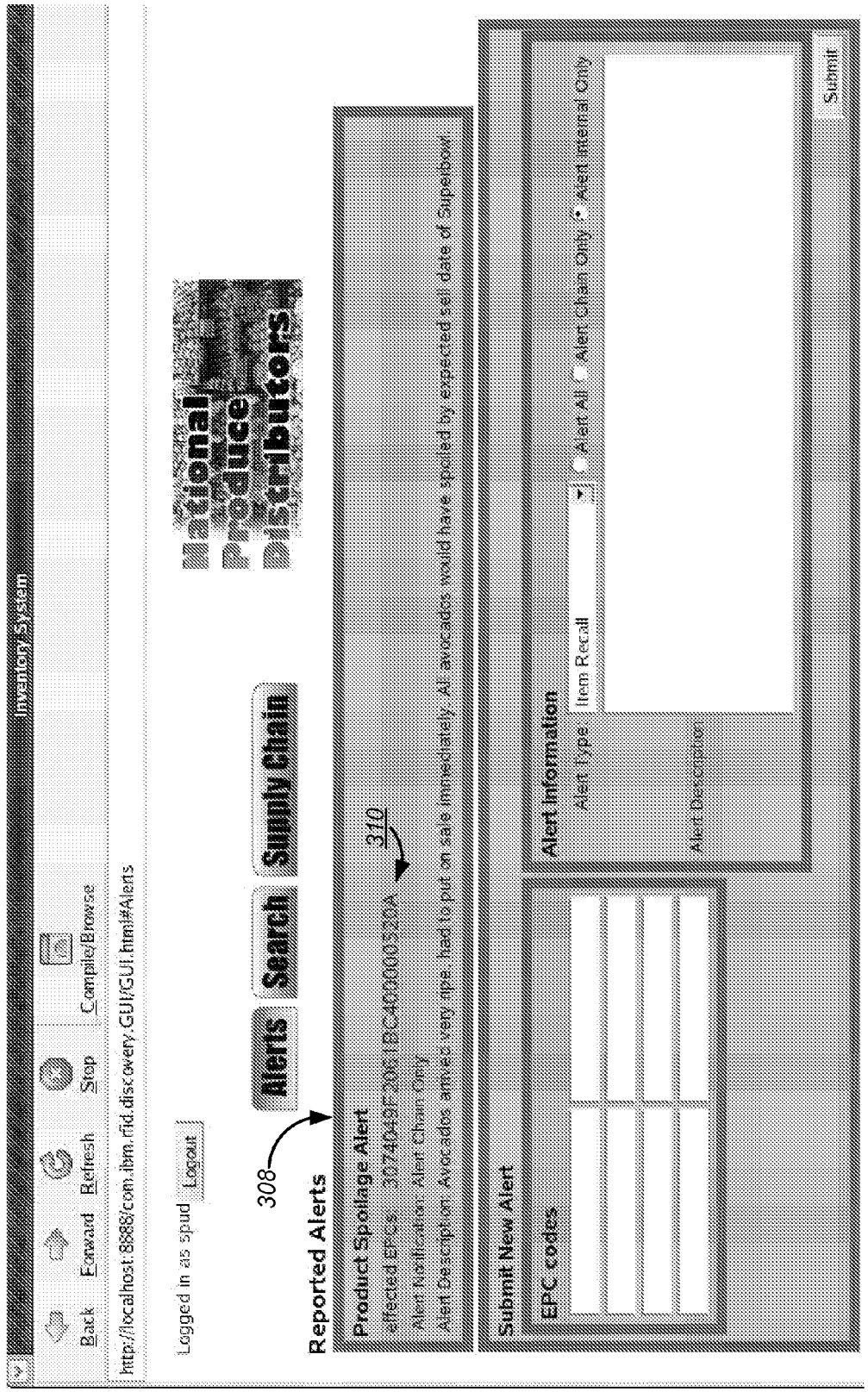
FIG. 3C is a screenshot of an alerts screen of the application in FIG. 3A.

This example uses an application (122) that tracks the freshness of avocados across a food supply chain and allows the rerouting of products that are unsatisfactory. As can be seen in FIG. 3A, Spud logs on to a produce-tracking application (122) using a web browser and his user name and password. The application displays a home page (302), as shown in FIG. 3B. Spud notices that the "Alerts" tab (304) is highlighted and clicks on the tab (304), which opens an Alerts screen (306), as shown in FIG. 3C.

Figure 3D:
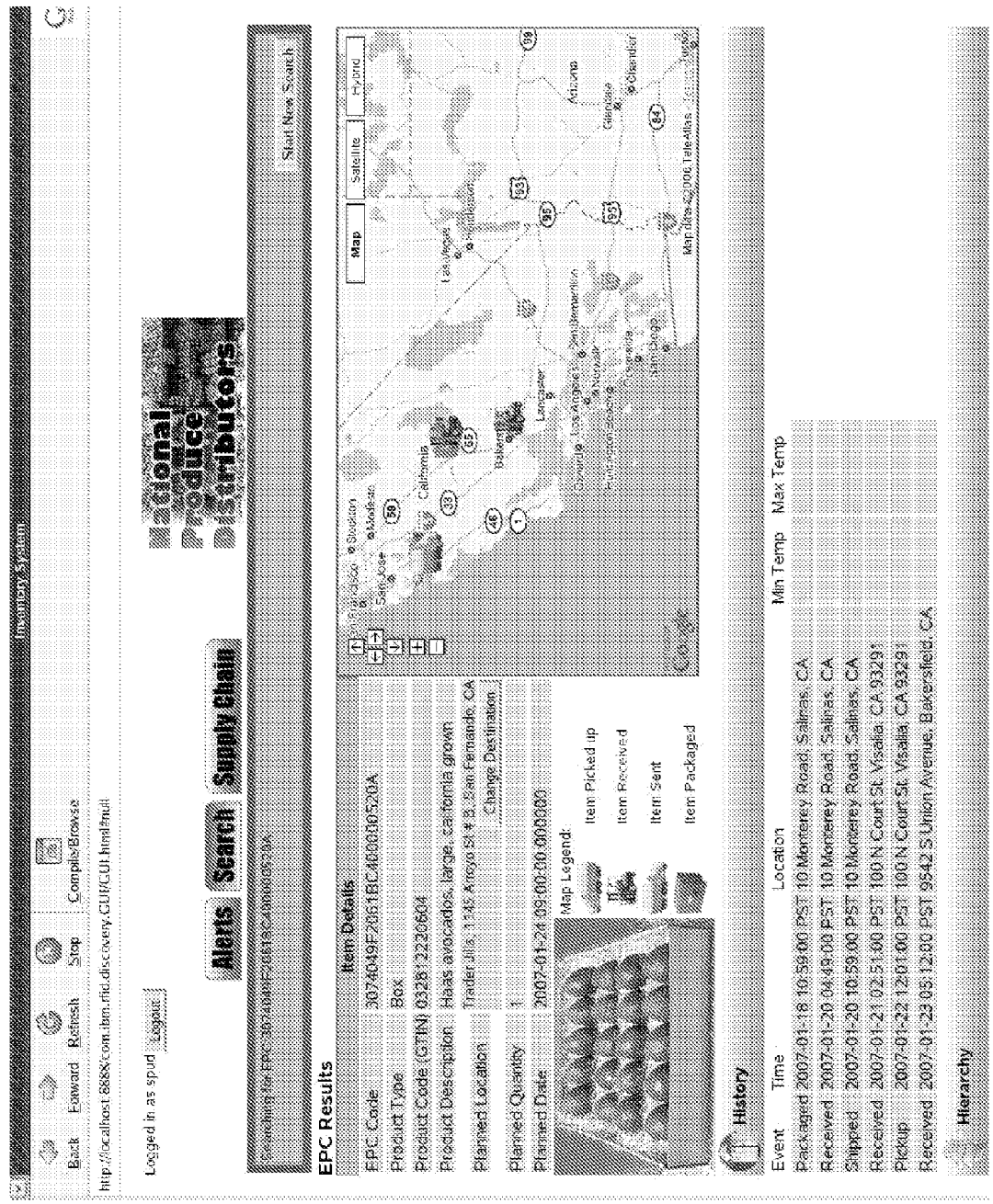
FIG. 3D is a screenshot of an EPC details screen of the application in FIG. 3A.
Figure 3E:
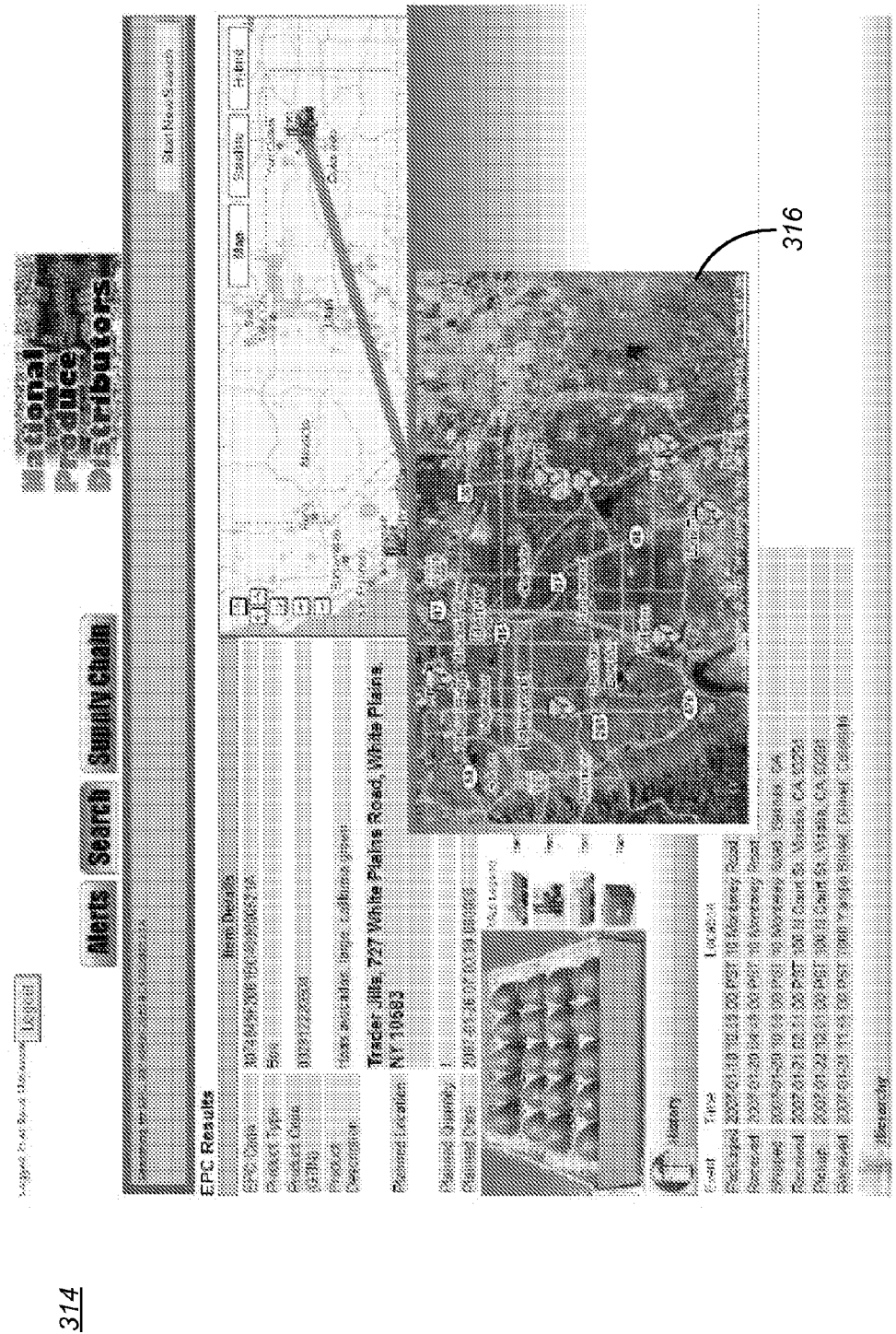
FIG. 3E is a screenshot of a container details screen of the application in FIG. 3A.

On the Alerts screen (306), Spud notices a product spoilage alert (308) from Sandy stating that the avocados she received were already very ripe. Spud clicks on the EPC link (310) of the referenced avocado crate to see detailed information, which opens an EPC details screen (312), as shown in FIG. 3D.

At the EPC details screen (312), Spud does not notice anything out of the ordinary. He clicks onto the container EPC to see what happened to Sandy's shipment on a higher item aggregation level, which opens the container details (314) screen shown in FIG. 3E.

On the container details screen (314), Spud notices that the temperature on the container during one of the transport legs was above the optimal temperature. This is why the avocados had ripened more quickly than expected. By looking up different EPC codes (using the discovery service and his secure certificate in the background), Spud also notices that the time and location for the crates' deliveries is several days away. He worries that the avocados will be too ripe by the time they arrive. Spud discovers that some crates are intended to be sent to Nick and will arrive in 3 days from now.

Spud reviews the map (316) that is displayed at the bottom of the page, which shows that some crates are currently in Colorado. Spud decides to proactively re-route these avocados to local stores in Colorado by clicking on the store icons on the map. He also adds a note to all of the affected locations so that other users of the system will know why these avocados have been re-routed.

As can be seen in this relatively basic example, the methods and system of the invention can greatly enhance the interactions between the different parties in a supply chain and lead to significant improvements.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

A number of implementations of the invention have been described. Nevertheless, it will be understood that various modifications may be made without departing from the spirit and scope of the invention. For example, the access control to the discovery service has been described on an individual party basis. However, various types of group-based access control are also possible as long as the system also contains the appropriate features for managing the group information. Accordingly, other embodiments are within the scope of the following claims.

The invention claimed is:

1. A computer-implemented method for managing security and privacy associations between an electronic product code value and an address of a repository containing information about an item represented by the electronic product code, the method comprising:

providing a service interface to the repository, the service interface providing access to the repository for one or more parties authorized to use the repository, with respect to the item;

issuing, by an authoritative party and prior to accessing the repository, a security certificate to each of the one or more parties that are authorized to use the repository in conducting a supply chain transaction;

in response to a party among the one or more parties sensing the electronic product code, creating a record in the repository, the record representing the sensing of the electronic product code and including the security certificate belonging to the party that sensed the electronic product code; and storing a data sharing attribute with each record in the repository, the data sharing attribute being defined by an owner of the electronic product code information in the repository, the data sharing attribute specifying a subset of parties among the one or more parties that has permission to access the record.

2. The method of claim 1, wherein sensing the electronic product code includes sensing the electronic product code with a radio frequency identification sensor.

3. The method of claim 1, wherein the one or more parties are represented by electronic product code information services.

4. The method of claim 1, wherein creating a record includes creating a record immediately upon a party among the one or more parties sensing an electronic product code for the first time.

5. The method of claim 1, wherein the subset of parties specified by the data sharing attribute includes all parties authorized to use the repository.

6. The method of claim 1, wherein the subset of parties specified by the data sharing attribute includes parties authorized to use the repository and which have sensed the electronic product code associated with the record.

7. The method of claim 1, wherein providing a service interface comprises:

providing a service interface that includes a plurality of services enabling secure traceability of the item represented by the electronic product code, the service interface further defining mechanisms for secure and privacy-preserving network access to the records in the repository by one or more querying parties, wherein the mechanisms for secure and privacy-preserving network access include one or more of: the use of proxy services, the use of role-based, policy-based, cell level data disclosure control of information in the repository, and the use of visibility control of the repository in one or more discovery services.

8. The method of claim 7, wherein the service interface includes a Notify service for storing a new record in the repository when a party senses an electronic product code that the party has not sensed before.

9. The method of claim 7, wherein the service interface includes a Get all addresses service for obtaining data about what parties have sensed a particular electronic product code.

10. The method of claim 7, wherein the service interface includes a Get first address service for obtaining data about the first party to notify the repository about the existence of a particular electronic product code.

11. The method of claim 7, wherein the service interface includes a Get last address service for obtaining data about the party that currently has custody of an item with a particular electronic product code.

12. The method of claim 7, wherein the service interface includes a Get my records service for obtaining data about which electronic product codes a querying party has sensed.

13. The method of claim 7, wherein the service interface includes a Get my record service for obtaining data about the record belonging to the querying party for a particular electronic product code, if such a record exists in the repository.

14. The method of claim 7, wherein the service interface includes a Change visibility service for changing a data visibility attribute belonging to the querying party for a particular electronic product code.

15. The method of claim 7, wherein the service interface includes a Delete my record service for removing a record belonging to the querying party for a particular electronic product code.

16. The method of claim 7, wherein the service interface includes a Delete my old records service for removing from the repository any records belonging to the querying party having a timestamp lower than a current timestamp.

17. A computer program product comprising a non-transitory computer useable medium including a computer readable program, for managing security and privacy associations between an electronic product code value and an address of a repository containing information about an item represented by the electronic product code, wherein the computer readable program when executed on a computer causes the computer to:

provide a service interface to the repository, the service interface providing access to the repository for one or more parties authorized to use the repository, with respect to the item;

issue, by an authoritative party and prior to accessing the repository, a security certificate to each of the one or more parties that are authorized to use the repository in conducting a supply chain transaction;

in response to a party among the one or more parties sensing the electronic product code, create a record in the repository, the record representing the sensing of the electronic product code and including the security certificate belonging to the party that sensed the electronic product code; and store a data sharing attribute with each record in the repository, the data sharing attribute being defined by an owner of the electronic product code information in the repository, the data sharing attribute specifying a subset of parties among the one or more parties that has permission to access the record.

18. The computer program product of claim 17, wherein creating a record includes creating a record immediately upon a party among the one or more parties sensing an electronic product code for the first time.

19. The computer program product of claim 17, wherein the subset of parties specified by the data sharing attribute includes all parties authorized to use the repository.

20. The computer program product of claim 17, wherein the subset of parties specified by the data sharing attribute includes parties authorized to use the repository and which have sensed the electronic product code associated with the record.

21. The computer program product of claim 17, wherein causing the computer to provide a service interface comprises causing the computer to:

provide a service interface that includes a plurality of services enabling secure traceability of the item represented by the electronic product code, the service interface further defining mechanisms for secure and privacy-preserving network access to the records in the repository by one or more querying parties, wherein the mechanisms for secure and privacy-preserving network access include one or more of: the use of proxy services, the use of role-based, policy-based, cell level data disclosure control of information in the repository, and the use of visibility control of the repository in one or more discovery services.

22. The computer program product of claim 21, wherein the service interface is a web service interface.

23. The computer program product of claim 21, wherein the service interface is an application programming interface.

24. A discovery service operable to provide a mapping from an electronic product code number to a set of electronic product code information services that include event information and item information about the electronic product code number, the discovery service comprising:

a repository containing records that represent a first sensing of the electronic product code by the respective electronic product code information services, each record including a security certificate issued by an authoritative party to the electronic product code information service that sensed the electronic product code, and a data sharing attribute, the data sharing attribute being defined by an owner of the electronic product code information in the repository and specifying a subset of electronic product code information services that has permission to access the record; and a service interface through which electronic product code information services and applications can access the records in accordance with the specified data sharing attributes in each record, the service interface including plurality of services enabling secure traceability of the item represented by the electronic product code, wherein the service interface further defines mechanisms for secure and privacy-preserving network access to the records in the repository, the mechanisms including one or more of: the use of proxy services, the use of role-based, policy-based, cell level data disclosure control of information in the repository, and the use of visibility control of the repository in one or more discovery services.

25. The discovery service of claim 24, wherein the service interface includes a Notify service for storing a new record in the repository when an electronic product code information service senses an electronic product code that the electronic product code information service has not sensed before.

26. The discovery service of claim 24, wherein the service interface includes a Get all addresses service for obtaining data about what electronic product code information services have sensed a particular electronic product code.

27. The discovery service of claim 24, wherein the service interface includes a Get first address service for obtaining data about the first electronic product code information service to notify the repository about the existence of a particular electronic product code.

28. The discovery service of claim 24, wherein the service interface includes a Get last address service for obtaining data about the electronic product code information service that currently has custody of an item with a particular electronic product code.

29. The discovery service of claim 24, wherein the service interface includes a Get my records service for obtaining data about which electronic product codes a querying electronic product code information service has sensed so far.

30. The discovery service of claim 24, wherein the service interface includes a Get my record service for obtaining data about the record belonging to the querying electronic product code information service for a particular electronic product code, if such a record exists in the repository.

31. The discovery service of claim 24, wherein the service interface includes a Change visibility service for changing the data attribute belonging to the querying electronic product code information service for a particular electronic product code.

32. The discovery service of claim 24, wherein the service interface includes a Delete my record service for removing a record belonging to the querying electronic product code information service for a particular electronic product code.

33. The discovery service of claim 24, wherein the service interface includes a Delete my old records service for removing from the repository any records belonging to the querying electronic product code information service having a timestamp is lower than a current timestamp.

* * * * *